US010769969B2

(12) United States Patent
Stoop et al.

(10) Patent No.: US 10,769,969 B2
(45) Date of Patent: Sep. 8, 2020

(54) ELECTRONIC SHELF DISPLAY TAG AND POWERED SHELF SUPPORT TRACK SYSTEM, APPARATUS AND METHOD OF USE

(71) Applicant: Opticon Sensors Europe B.V., Hoofddorp (NL)

(72) Inventors: Kees Stoop, Hoofddorp (NL); Ronny de Winter, Hoofddorp (NL); Henrik Marcolla, Hoofddorp (NL)

(73) Assignee: Opticon Sensors Europe B.V., Hoofddorp (NL)

( * ) Notice: Subject to any disclaimer, the term of this patent is extended or adjusted under 35 U.S.C. 154(b) by 59 days.

(21) Appl. No.: 16/012,485

(22) Filed: Jun. 19, 2018

(65) Prior Publication Data

US 2019/0385490 A1  Dec. 19, 2019

(51) Int. Cl.
*G09F 3/20* (2006.01)
*G06F 3/147* (2006.01)
*G09F 3/02* (2006.01)

(52) U.S. Cl.
CPC .............. *G09F 3/208* (2013.01); *G06F 3/147* (2013.01); *G09F 3/02* (2013.01); *G09F 3/204* (2013.01); *G09G 2380/04* (2013.01)

(58) Field of Classification Search
CPC ........................................................ G09F 3/208
USPC ................................................... 40/466, 655
See application file for complete search history.

(56) References Cited

U.S. PATENT DOCUMENTS 5,473,832 A    12/1995  Briechle et al.
5,553,412 A *   9/1996  Briechle ................. G09F 3/204
                                                  40/124.01
5,816,550 A    10/1998  Watanabe et al.
6,622,410 B2    9/2003  Wilkes et al.
9,984,593 B2    5/2018  Jubro et al.
(Continued)

FOREIGN PATENT DOCUMENTS

EP         0200473 A2    11/1986
WO      2016/111615 A1     7/2016

OTHER PUBLICATIONS

Authorized Officer: Zanna, Argini, International Search Report and Written Opinion issued in counterpart PCT application No. PCT/IB2019/054775, dated Oct. 1, 2019, 16 pp.

*Primary Examiner* — Joanne Silbermann
(74) *Attorney, Agent, or Firm* — Kaplan Breyer Schwarz, LLP (57) ABSTRACT

An electronic shelf display tag apparatus includes a programmable processor having a memory in communication with each of a display screen, and a wireless communication transceiver. The electronic shelf display tag apparatus further includes a power supply device configured to supply power to the processor, the display screen, the wireless communication transceiver, and an enclosure configured to encapsulate the processor, the display screen, the wireless communication transceiver, the audio playback device and the power supply device. The enclosure further including an electrical connector having at least one conductor in communication with the power supply device, at least one inclined stop configured to engage an interior edge of a channel of a shelf support track, and a support rib configured to engage an exterior edge of the channel of the shelf support track.

12 Claims, 9 Drawing Sheets

(56) References Cited

U.S. PATENT DOCUMENTS

| | | | |
|---|---|---|---|
| 2005/0218218 A1* | 10/2005 | Koster | G06F 3/147 |
| | | | 235/383 |
| 2010/0088937 A1* | 4/2010 | Lee | G09F 3/20 |
| | | | 40/642.02 |
| 2010/0225593 A1* | 9/2010 | Scibora | G06F 1/1626 |
| | | | 345/172 |
| 2014/0158846 A1* | 6/2014 | Nicolis | G09F 3/208 |
| | | | 248/309.1 |
| 2016/0027348 A1* | 1/2016 | Joliey | A47F 5/0068 |
| | | | 40/5 |
| 2018/0268745 A1* | 9/2018 | de Haas | G09F 3/208 |

* cited by examiner

ELECTRONIC SHELF DISPLAY TAG AND POWERED SHELF SUPPORT TRACK SYSTEM, APPARATUS AND METHOD OF USE

FIELD OF THE INVENTION

The present invention relates to an electronic shelf label (ESL) or electronic shelf display tag for displaying information and a corresponding powered shelf support track for use in combination with the electronic shelf display tag.

BACKGROUND

Article information display systems may be used to electronically provide information about an associated product within a retail store environment. The system typically utilizes Electronic Shelf Labels (ESLs) having a variable graphical display to electronically display information about the product. For example, information displayed may include price, price per unit weight, SKU codes and other product relevant information. Such a system may be used in retail supermarkets, drug stores, grocery stores, hardware stores, auto parts stores, or other settings where variable article information is desired to be displayed.

The article information display system reduces the labor that is required to update the information on the ESLs and diminishes the chances of displaying an incorrect price due to human error. Furthermore, the electronic article information display system facilitates the changing of a large number of prices at once, as all of the prices may be controlled and changed at a central computer or in the alternative, remotely at the position of the ESL with a near-field wireless communicator device.

In order to install such a display system, an auxiliary rail is designed to interact with an electronic display tag is mounted to the store shelving units. The ESL then needs to be connected to the auxiliary rail to both provide a mechanically secure connection such that customers during shopping or store employees during re-stocking do not accidently remove or damage the ESL, and to provide a power supply to the ESL when mounted on the auxiliary rail.

Accordingly, there is a need for an ESL that can quickly and securely connect to a powered shelf support track.

SUMMARY

The present invention, defined in the appended claims, provides an electronic shelf label or electronic shelf display tag, and a powered shelf support track for use in combination with the shelf display tag that addresses the needs outlined above. The following Summary is provided to introduce a selection of concepts in a simplified form that are further described below in the Detailed Description. The following Summary is not intended to be used to limit the scope of the claimed subject matter.

In one embodiment disclosed herein, electronic shelf display tag apparatus includes a programmable processor having a memory in communication with each of a display screen, a wireless communication transceiver, and an audio playback device. The electronic shelf display tag apparatus further includes a power supply device configured to supply power to the processor, the display screen, the wireless communication transceiver, and the audio playback device. The electronic shelf display tag apparatus further includes an enclosure configured to encapsulate the processor, the display screen, the wireless communication transceiver, the audio playback device and the power supply device. The enclosure further includes an electrical connector having at least one conductor in communication with the power supply device, at least one inclined stop configured to engage an interior edge of a channel of a shelf support track, and a support rib configured to engage an exterior edge of the channel of the shelf support track.

In another embodiment disclosed herein, an electronic shelf display system includes a shelf support track having a channel including an upper and lower interior edge, a lower exterior edge, and first and second power conductors within the channel. The electronic shelf display system further includes an electronic shelf display tag having a programmable processor having a memory in communication with each of a display screen, a wireless communication transceiver, and an audio playback device. The electronic shelf display tag further has a power supply device configured to supply power to the programmable processor, the display screen, the wireless communication transceiver, and the audio playback device. The electronic shelf display tag further has an enclosure configured to encapsulate the programmable processor, the display screen, the wireless communication transceiver, the audio playback device and the power supply device. The enclosure further including an electrical connector having at least one conductor in communication with the power supply device, at least one inclined stop configured to engage an interior edge of the channel of the shelf support track, and a support rib configured to engage an exterior edge of the channel of the shelf support track.

In another embodiment disclosed herein, a method of attaching an electronic shelf display tag to a powered shelf support track includes providing the powered shelf support track including a channel including an upper and lower interior edge, a lower exterior edge, and first and second power conductors within the channel. The method further includes providing the electronic shelf display tag including a display screen, a wireless communication transceiver, and an enclosure including an electrical connector, at least one inclined stop, and a support rib. The method further includes orienting the electronic shelf display tag to insert a conductive member of the electrical connector within the channel of the powered shelf support track, and rotating the electronic shelf display tag about a projecting member supporting the conductive member of the electrical connector within the channel of the powered shelf support track. The method further includes engaging, by rotating the electronic shelf display tag, two oppositely disposed first and second electrical conductors on the conductive member of the electrical connector to electrically contact the first and second power conductors within the channel, and engaging, by rotating the electronic shelf display tag, an inclined stop on the enclosure with at least one interior edge of the channel of the powered shelf support track. The method further includes engaging, by rotating the electronic shelf display tag, a support rib on the enclosure with an exterior edge of the channel of the powered shelf support track.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

Figure 1:
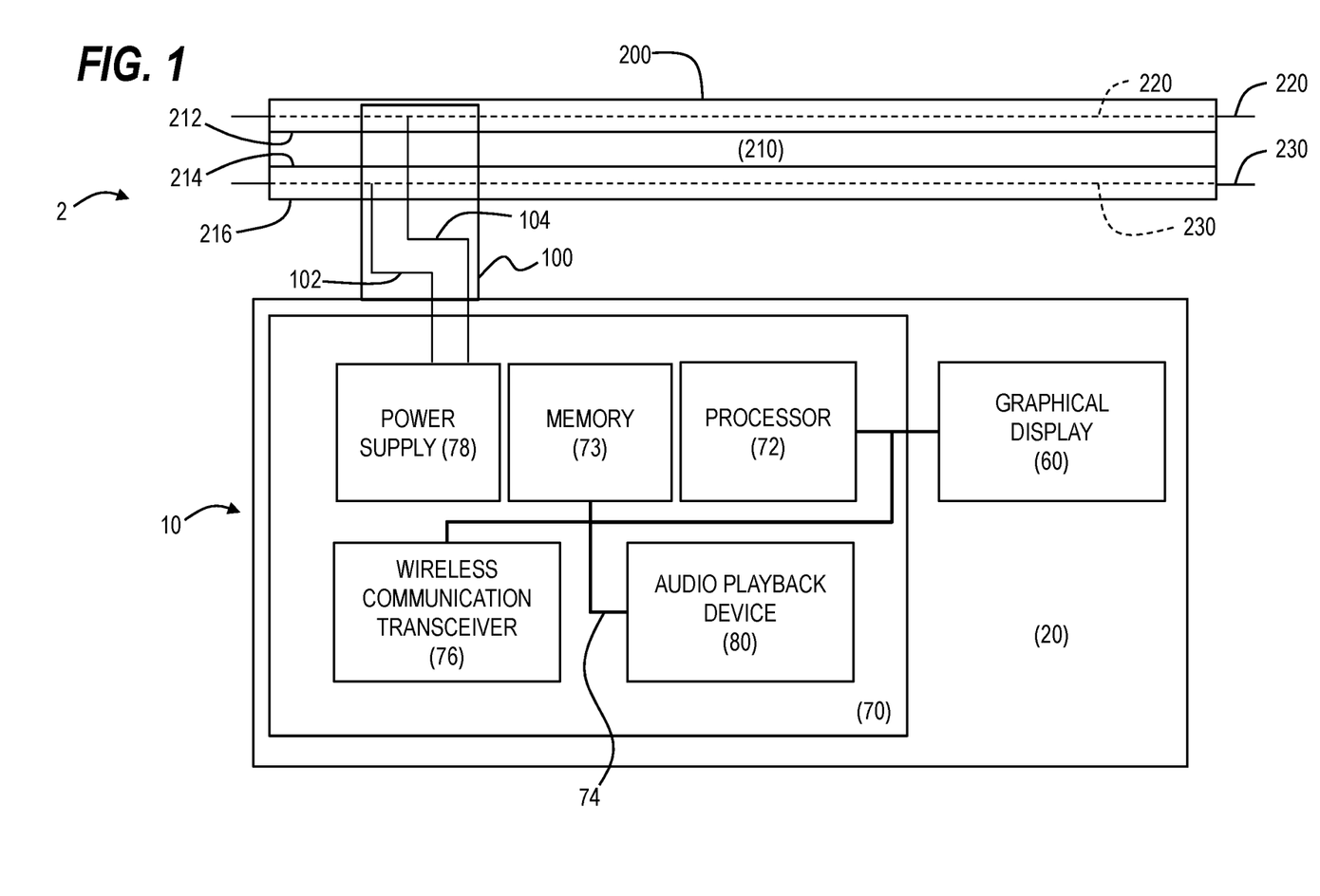
FIG. 1 illustrates a schematic diagram of a representative embodiment of a system of an electronic shelf display tag and powered shelf support track presented herein.

FIG. 1 illustrates a schematic diagram of a representative embodiment of a system 2 of an electronic shelf display tag 10 and powered shelf support track 200 presented herein. An electronic shelf display tag 10 includes an enclosure 20 housing a graphical display 60 and a printed circuit board 70 that provides a processor 72 in communication with a memory 73, a wireless communication transceiver 76, an antenna 90, (not shown in FIG. 1), and audio playback device 80 via a system bus 74. The printed circuit board 70 further includes a power supply 78 in communication with a projecting electrical connection 100 having an upper electrical connector 102 and a lower electrical connector 104 disposed in an electrically engageable/disengage-able configuration with a first power conductor 220 and a second power conductor 230 of the powered shelf support track 200. The first power conductor 220 and second power conductor 230 are covered within a channel 210 by an upper interior edge 212 and a lower interior edge 214 of the channel 210, respectively.

Figure 2:
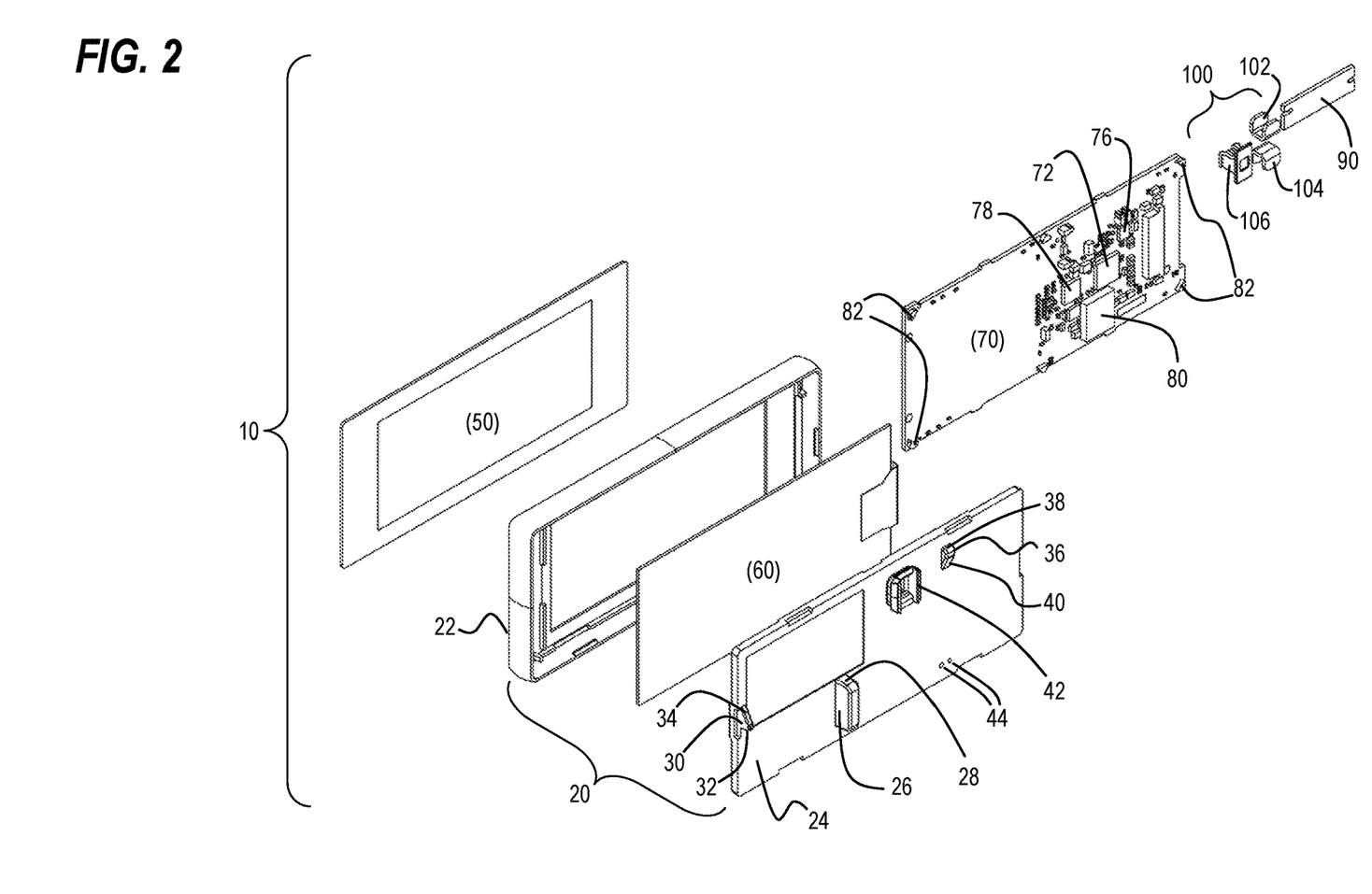
FIG. 2 illustrates an exploded view of a representative embodiment of the electronic shelf display tag presented herein.

FIG. 2 illustrates an exploded view of a representative embodiment of the electronic shelf display tag 10 presented herein. An enclosure 20 includes a front enclosure form 22 and a rear enclosure form 24 that encloses both the graphical display 60 and the printed circuit board 70.

The rear enclosure form 24 includes a lower rib 26 having an upwardly disposed stop edge 28, a lower inclined stop 30 having a downwardly disposed stop edge 32 and an inclined ramp 34, and an upper inclined stop 36 having an upwardly disposed stop edge 38 and an inclined ramp 40. The rear enclosure form 24 further includes powered shelf support track engagement forms 42 that provide mechanical support for the projecting electrical connection 100 particularly when engaged with the channel 210 of the powered shelf support track 200, and a number of audio ports 44 for transmitting sound from the audio playback device 80 on the printed circuit board 70.

The front enclosure form 22 further supports a front window 50 configured to allow the graphical display 60 to be visible within the enclosure 20.

The printed circuit board 70 may comprise a processor 72, a memory 73, a system bus 74, (not shown in FIG. 2), connecting a plurality of electrical components on the printed circuit board 70, a wireless communication transceiver 76 in communication with a wireless antenna 90, a power supply 78 and an audio playback device 80. The printed circuit board 70 may also include light emitting diodes (LEDs) 82 or any equivalent light sources attached to distal corners of the printed circuit board 70 the provide both feedback to store employees when updating or changing information displayed on the electronic shelf display tag 10 and/or notification purposes to customers who may notice the flashing LEDs 82 to draw the customer's attention to sale or promotional items. To accommodate the LEDs 82 mounted on the printed circuit board 70, the front enclosure form 22 and the rear enclosure form 24 of the enclosure 20 may be formed from a translucent or transparent material capable of transmitting observable light emissions from the LEDs 82 through the enclosure for the purposes of notification or feedback.

A projecting electrical connection 100 includes an upper electrical connector 102, a lower electrical connector 104 and a central spacer post 106 that supports the upper 102 and lower 104 electrical connectors with the powered shelf support track engagement forms 42.

Figure 3:
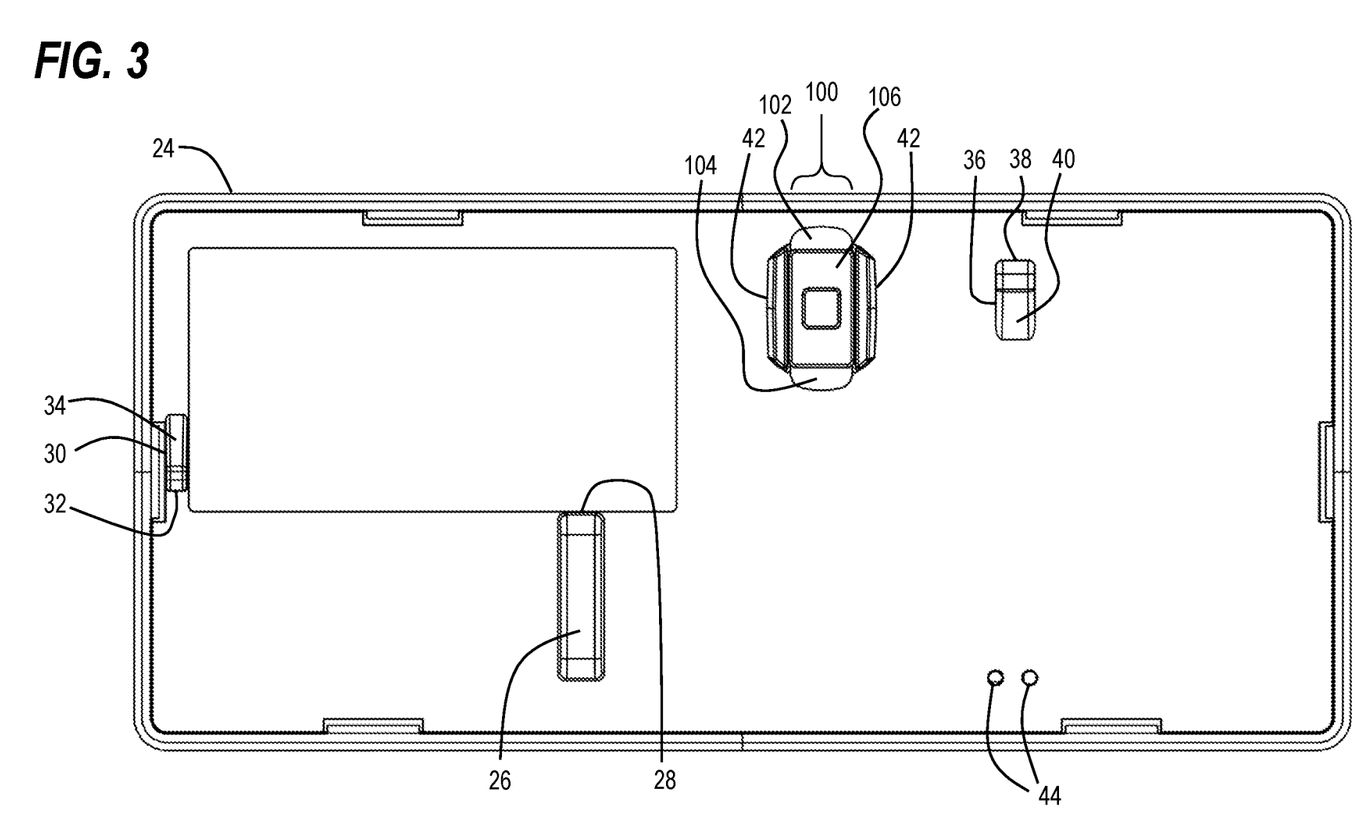
FIG. 3 illustrates a rear assembly view of the representative embodiment of the electronic shelf display tag of FIG. 2.

FIG. 3 illustrates a rear assembly view of the representative embodiment of the electronic shelf display tag of FIG. 2, and more particularly the rear enclosure form 24, the lower rib 26 having the upwardly disposed stop edge 28, the lower inclined stop 30 having the downwardly disposed stop edge 32 and the upper inclined stop 36 having the upwardly disposed stop edge 38, and the projecting electrical connection 100 including the upper electrical connector 102, the lower electrical connector 104 and the centrally disposed central spacer post 106 located within the powered shelf support track engagement forms 42.

In summary, FIGS. 1-3 illustrate an electronic shelf display tag apparatus 10 comprising a programmable processor 72 having a memory 73 in communication with each of a display screen 60, a wireless communication transceiver 76, and an audio playback device 80. A power supply device 78 is configured to supply power to the processor 72, the memory 73, the display screen 60, the wireless communication transceiver 76, and the audio playback device 80. The electronic shelf display tag apparatus 10 further includes an enclosure 20 configured to encapsulate the processor 72, the memory 73, the display screen 60, the wireless communication transceiver 76, the audio playback device 80 and the power supply device 78, where the enclosure 20 further includes an electrical connector 100 having at least one conductor 102, 104 in communication with the power supply device 78, at least one inclined stop 30, 36 configured to engage an interior edge 212, 214, 216 of a channel 210 of a shelf support track 200, and a support rib 26 configured to engage an exterior edge 218 of the channel 210 of the shelf support track 200.

The electronic shelf display tag apparatus 10 further includes the display screen 60 being disposed on a front face of the enclosure 20 and may further comprises a e-paper display, an LCD display, or an LED display.

The electronic shelf display tag apparatus 10 further includes the electrical connector further having a projecting member 100 configured to be inserted into and rotated within the channel 210 of the shelf support track 200. The electrical connector 100 further includes two oppositely disposed first 102 and second 104 electrical conductors disposed on a distal end of the projecting member 100 configured to be inserted into and rotated within the channel 210 of the shelf support track 200, the two oppositely disposed first 102 and second 104 electrical conductors configured to engage a corresponding first 220 and a second 230 power conductor within the channel 210 of the shelf support track 200.

The electronic shelf display tag apparatus 10 further includes the at least one inclined stop 30, 36 being disposed on a rear face 24 of the enclosure 20 opposite the display screen 60 and comprising an upper inclined stop 36 configured to engage an upper interior edge 212 of the channel 210 of the shelf support track 200 when the electrical connector 100 is rotated within the channel 210 of the shelf support track 200 to a locked position, (see FIG. 4, below).

The electronic shelf display tag apparatus 10 further includes the at least one inclined stop 30, 36 being disposed on the rear face 24 of the enclosure 20 opposite the display screen 60 further including a lower inclined stop 30 configured to engage a lower interior edge 214 of the channel 210 of the shelf support track 200 when the electrical connector 100 is rotated within the channel 210 of the shelf support track 200 to the locked position, (see FIG. 4, below).

The electronic shelf display tag apparatus 10 further includes the support rib 26 being disposed on a rear face 24 of the enclosure 20 opposite the display screen 60 and configured to engage a lower exterior edge 218 of the channel 210 of the shelf support track 200 when the electrical connector 100 is rotated within the channel 210 of the shelf support track 200 to a locked position, (see FIG. 4, below).

The electronic shelf display tag apparatus 10 further includes the enclosure 20 further including at least one audio port 44 disposed on a rear face 24 of the enclosure 20 opposite the display screen 60 and configured to provide audio from the audio playback device 80 outside of a profile projection of the shelf support track 200 onto the enclosure 20.

Figure 4:
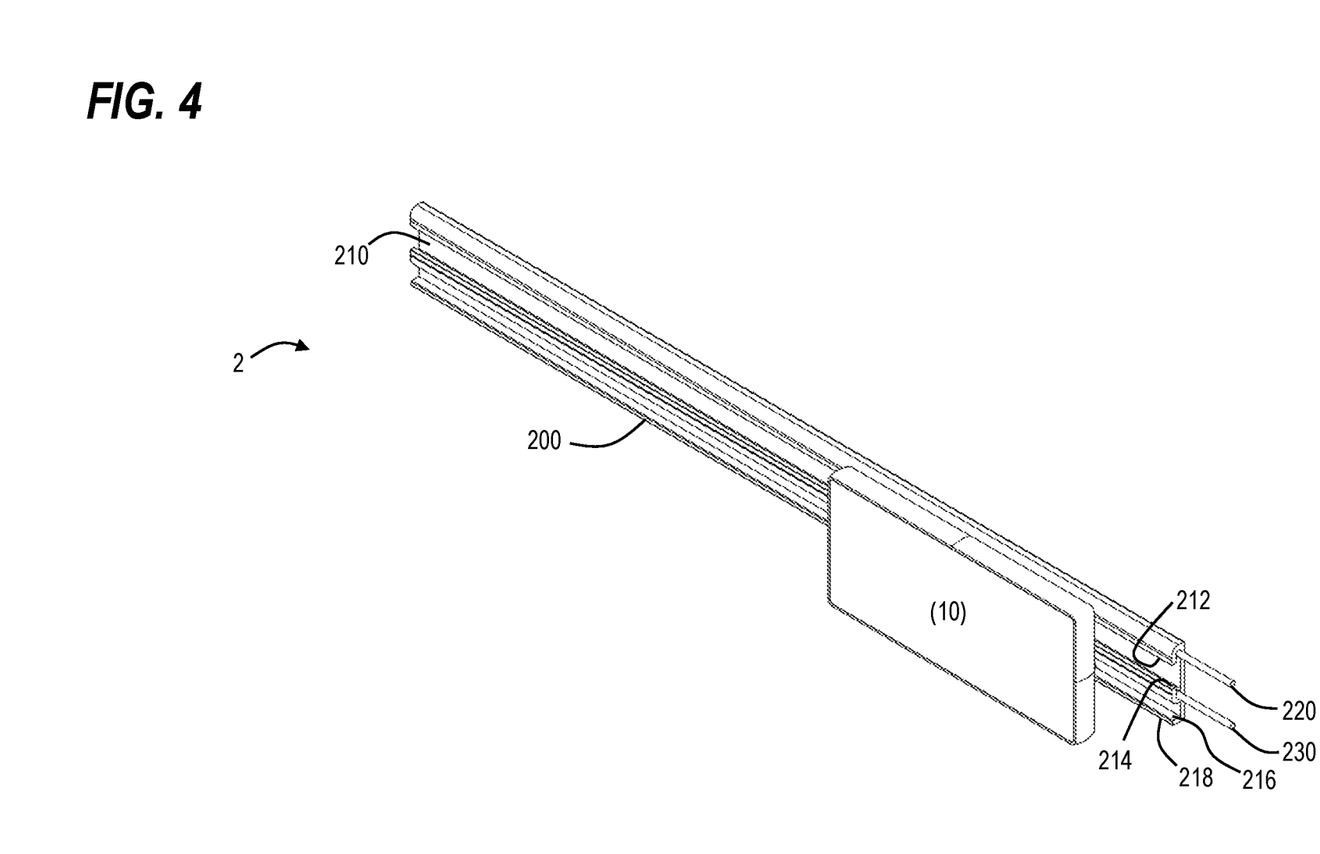
FIG. 4 illustrates a perspective view of the system including the electronic shelf display tag and the powered shelf support track presented herein.

FIG. 4 illustrates a perspective view of the system 2 including the electronic shelf display tag 10 and the powered shelf support track 200 presented herein in an electrically connected and locked position.

The electrical connection occurs when the upper electrical connector 102 and the lower electrical connector 104 of the projecting electrical connection 100 engage their corresponding first 220 and second 230 power conductors of enclosed by the channel 210 of the powered shelf support track 200.

The locked position occurs when the stop edges of the respective lower rib 26, lower inclined stop 30 and upper inclined stop 36 engage respective edges of the powered shelf support track 200 when the projecting electrical connection 100 is rotated into a final locked position with the channel 210 of the powered shelf support track 200.

Figure 5:
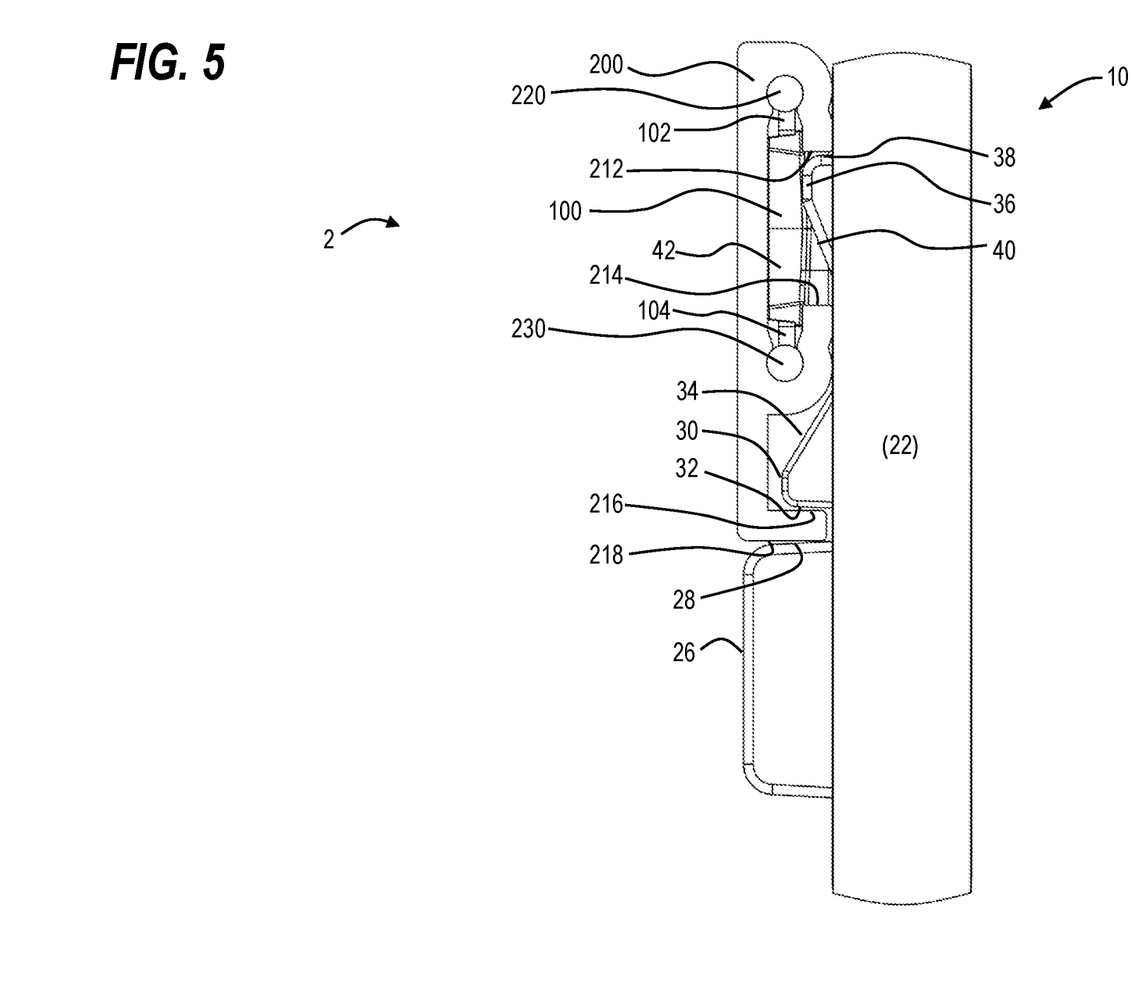
FIG. 5 illustrates a side assembly view of the system including the electronic shelf display tag and the powered shelf support track presented herein.

FIG. 5 illustrates a side assembly view of the system 2 including the electronic shelf display tag 10 in a fully locked and electrically conducting configuration with the powered shelf support track 200. This side assembly view illustrates the front enclosure form 22 side edge and the rear enclosure form 24 projecting features engaging with the geometry of the powered shelf support track 200.

The upper electrical connector 102 and the lower electrical connector 104 of the projecting electrical connection 100 engage their corresponding first 220 and second 230 power conductors of enclosed by the channel 210 of the powered shelf support track 200. The upper 102 and lower 104 electrical connectors are conductively engaged with the power supply 78 on the printed circuit board 70 and thus supplies power to the electronic shelf display tag 10 from the first 220 and second 230 power conductors of the powered shelf support track 200.

To mechanically lock the electronic shelf display tag 10 to the powered shelf support track 200, the upwardly disposed stop edge 28 of the lower rib 26 engages the lower exterior edge of support track 218 of the powered shelf support track 200. Furthermore, the downwardly disposed stop edge 32 of lower inclined stop 30 engages the upper interior edge of support track 216 of the powered shelf support track 200. In the alterative, the downwardly disposed stop edge 32 of lower inclined stop 30 may engage the lower interior edge 214 of the powered shelf support track 200. Furthermore, to mechanically lock the electronic shelf display tag 10 to the powered shelf support track 200, the upwardly disposed stop edge 38 of the upper inclined stop 36 engages the upper interior edge 212 of the channel 210 of the powered shelf support track 200. Each of the stop edges engage each respective portion of the powered shelf support track 200 substantively simultaneously based on the corresponding geometries of the protrusions on the rear enclosure form 24 of the electronic shelf display tag 10 and the powered shelf support track 200.

Figure 6A:
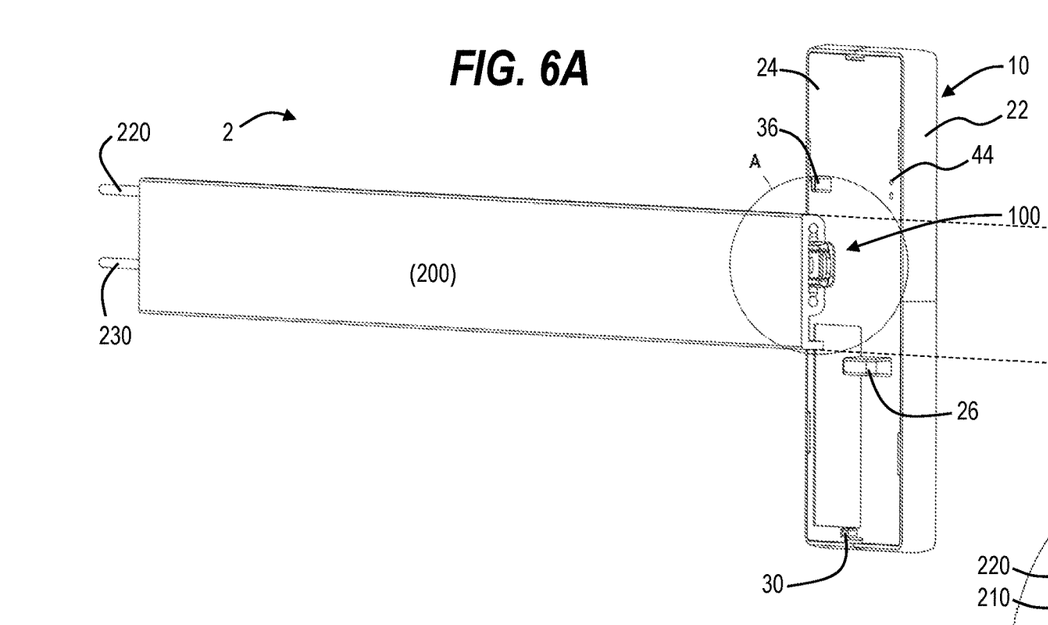
FIG. 6A illustrates a rear perspective cut-away view of an initial phase of engaging the electronic shelf display tag with the powered shelf support track.

FIG. 6A illustrates a rear perspective cut-away view of an initial phase of engaging the electronic shelf display tag 10 with the powered shelf support track 200. FIG. 6A illustrates the electronic shelf display tag 10 being oriented substantively orthogonal to the longitudinal axis of the powered shelf support track 200 such that the projecting electrical connection 100 is rotated to slidingly engage the interior of the channel 210 of the powered shelf support track 200.

Figure 6B:
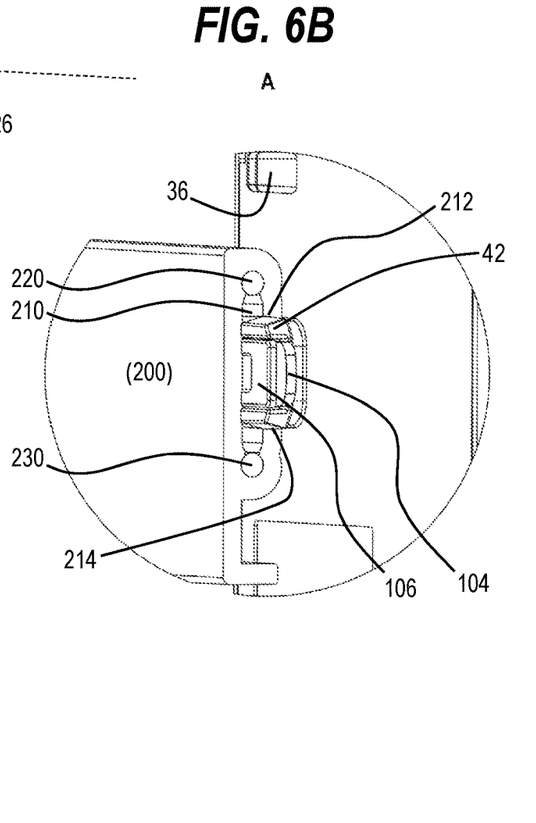
FIG. 6B illustrates a blow-up rear perspective cut-away view of "A" of FIG. 6A of the initial phase of engaging the electronic shelf display tag with the powered shelf support track.

FIG. 6B illustrates a blow-up rear perspective cut-away view of "A" of FIG. 6A of the initial phase of engaging the electronic shelf display tag with the powered shelf support track. FIG. 6B illustrates the projecting electrical connection 100 having the lower electrical connector 104 and the corresponding (not visible) upper electrical connector 102 oriented in a direction transverse to the first power conductor 220 and the second power conductor 230.

The powered shelf support track engagement forms 42 may include tapered projections for engaging the channel 210 when the projecting electrical connection 100 is brought into contact with the upper interior edge 212 and lower interior edge 214 of the channel 210 of the powered shelf support track 200.

In summary of FIGS. 4-6B, an electronic shelf display system 2 includes a shelf support track 200 having a channel 210 including an upper 212 and lower interior edge 214, an upper interior edge of support track 216, a lower exterior edge 218, and first 220 and second 230 power conductors within the channel 210. The electronic shelf display system 2 further includes an electronic shelf display tag 10 including a programmable processor 72 having a memory 73 in communication with each of a display screen 60, a wireless communication transceiver 76, and an audio playback device 80. The electronic shelf display tag 10 further includes a power supply device 78 is configured to supply power to the programmable processor 72, the memory 73, the display screen 60, the wireless communication transceiver 76, and the audio playback device 80. The electronic shelf display tag 10 further includes an enclosure 20 configured to encapsulate the programmable processor 72, the display screen 60, the wireless communication transceiver 76, the audio playback device 80 and the power supply device 78, the enclosure 20 further including an electrical connector 100 having at least one conductor 102, 104 in communication with the power supply device 78, at least one inclined stop 30, 36 configured to engage an interior edge 212, 214, 216 of the channel 210 of the shelf support track 200, and a support rib 26 configured to engage an exterior edge 218 of the shelf support track 200.

The system 2 further provides the display screen 60 being disposed on a front face 22 of the enclosure 20 further having a e-paper display, an LCD display or an LED display.

The system 2 further provides the electrical connector further including a projecting member 100 configured to be inserted into and rotated within the channel 210 of the shelf support track 200, and two oppositely disposed first 102 and second 104 electrical conductors disposed on a distal end of the projecting member 100 and configured to be inserted into and rotated within the channel 210 of the shelf support track 200, the two oppositely disposed first 102 and second 104 electrical conductors configured to engage the corresponding first 220 and second 230 power conductors within the channel 210 of the shelf support track 200.

The system 2 further provides the at least one inclined stop disposed on a rear face 24 of the enclosure 20 opposite the display screen 60 comprises an upper inclined stop 36 configured to engage an upper interior edge 212 of the channel 210 of the shelf support track 200 when the electrical connector 100 is rotated within the channel 210 of the shelf support track 200 to a locked position.

The system 2 further provides the at least one inclined stop is disposed on the rear face 24 of the enclosure 20 opposite the display screen 60 and further comprises a lower inclined stop 30 configured to engage a lower interior edge 214, 218 of the shelf support track 200 when the electrical connector 100 is rotated within the channel 210 of the shelf support track 200 to the locked position.

The system 2 further provides the support rib 26 is disposed on a rear face 24 of the enclosure 20 opposite the display screen 60 and configured to engage a lower exterior edge 218 of the shelf support track 200 when the electrical connector 100 is rotated within the channel 210 of the shelf support track 200 to a locked position.

The system 2 further provides at least one audio port 44 disposed on a rear face 24 of the enclosure 20 opposite the display screen 60 and configured to provide audio from the audio playback device 80 outside of a profile projection of the shelf support track 200 onto the enclosure 20.

Figure 7:
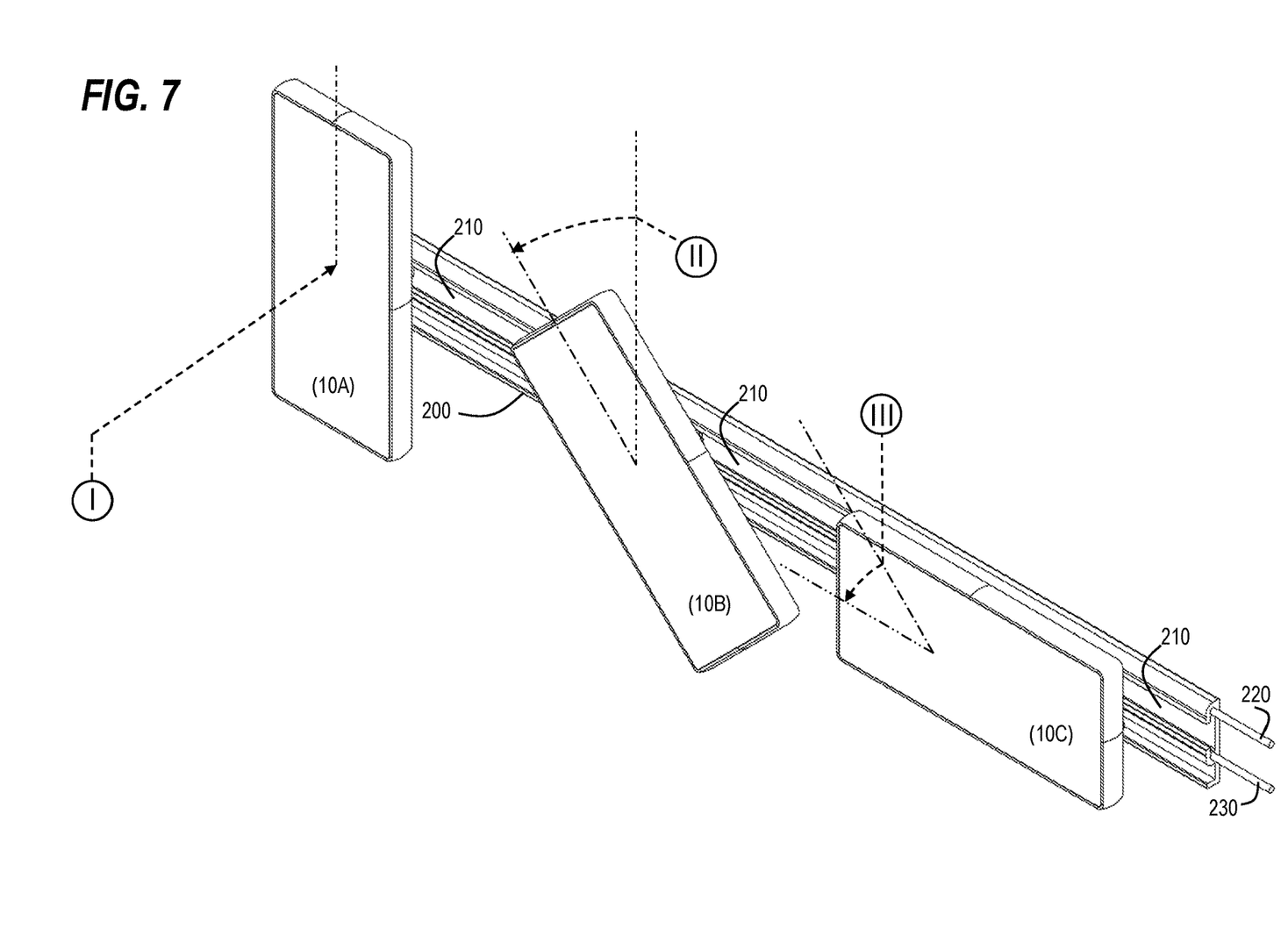
FIG. 7 illustrates a front perspective view of a method of engaging the electronic shelf display tag with the powered shelf support track as presented herein.
Figure 8:
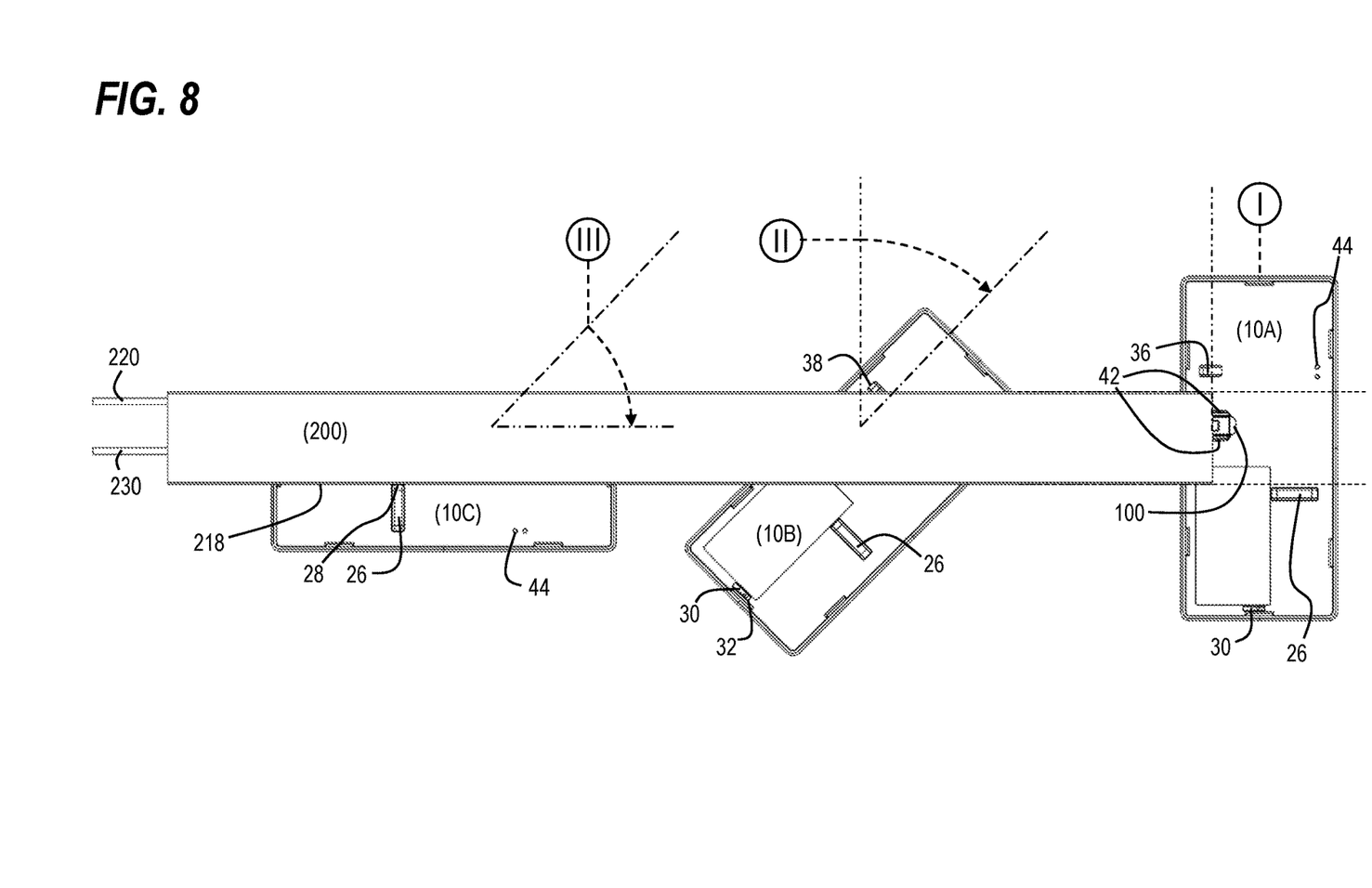
FIG. 8 illustrates a rear view of the method presented in FIG. 7 of engaging the electronic shelf display tag with the powered shelf support track as presented herein.

FIG. 7 illustrates a front perspective view and FIG. 8 illustrates a rear view of a method of engaging the electronic shelf display tag 10 with the powered shelf support track 200. The electronic shelf display tag 10 of FIGS. 1-6B is represented in FIGS. 7-8 as electronic shelf display tag 10A that is oriented in a transverse direction to the longitudinal axis of powered shelf support track 200 and moved in a direction I to insert the projecting electrical connection 100 into the channel 210 of the powered shelf support track 200.

Thereafter, the electronic shelf display tag is rotated in an angular direction II, represented by electronic shelf display tag 1013 into an intermediate position about the central axis of the projecting electrical connection 100. Finally, the electronic shelf display tag is further rotated in an angular direction III, represented by electronic shelf display tag 10C into a final position about the central axis of the projecting electrical connection 100. In the final position, the upper 102 and lower 104 electrical connectors of the projecting electrical connection 100 are brought into electrical contact with the first 220 and second 230 power conductors within the channel 210 of the powered shelf support track 200.

FIG. 8 further illustrates the lower rib 26, lower inclined stop 30 and upper inclined stop 36 on the rear enclosure form 24 that engage the powered shelf support track 200 at various positions: the lower rib 26 comes into contact with the lower exterior edge of support track 218 when the electronic shelf display tag 10C is in its final position; the inclined ramp 34 of the lower inclined stop 30 impinges upon the lower exterior edge of support track 218 until the stop edge 32 comes into contact with either the upper interior edge of support track 216, or in the alternative, the lower interior edge 214 when the electronic shelf display tag 10C is in its final position; and the inclined ramp 40 of the upper inclined stop 36 impinges upon an upper exterior edge of powered shelf support track until the stop edge 38 comes into contact with upper interior edge 212 when the electronic shelf display tag 10C is in its final position.

Removal of the electronic shelf display tag 10 proceeds in the reverse manner of the attachment sequence illustrated in FIGS. 7-8, namely, a user grasps the electronic shelf display tag 10 while it is securely mounted to the powered shelf support track 200 and rotates the electronic shelf display tag 10 about the projecting electrical connection 100 such that the stop edge 32 of the lower inclined stop 30 and the stop edge 38 of the upper inclined stop 36 each impinge upon the respective edges of the powered shelf support track 200 until the edges yield to the supplied rotational force. The electronic shelf display tag 10 is then rotated into a transverse position from its locked position where the projecting electrical connection 100 may then be pulled free from the channel 210 of the powered shelf support track 200.

Figure 9:
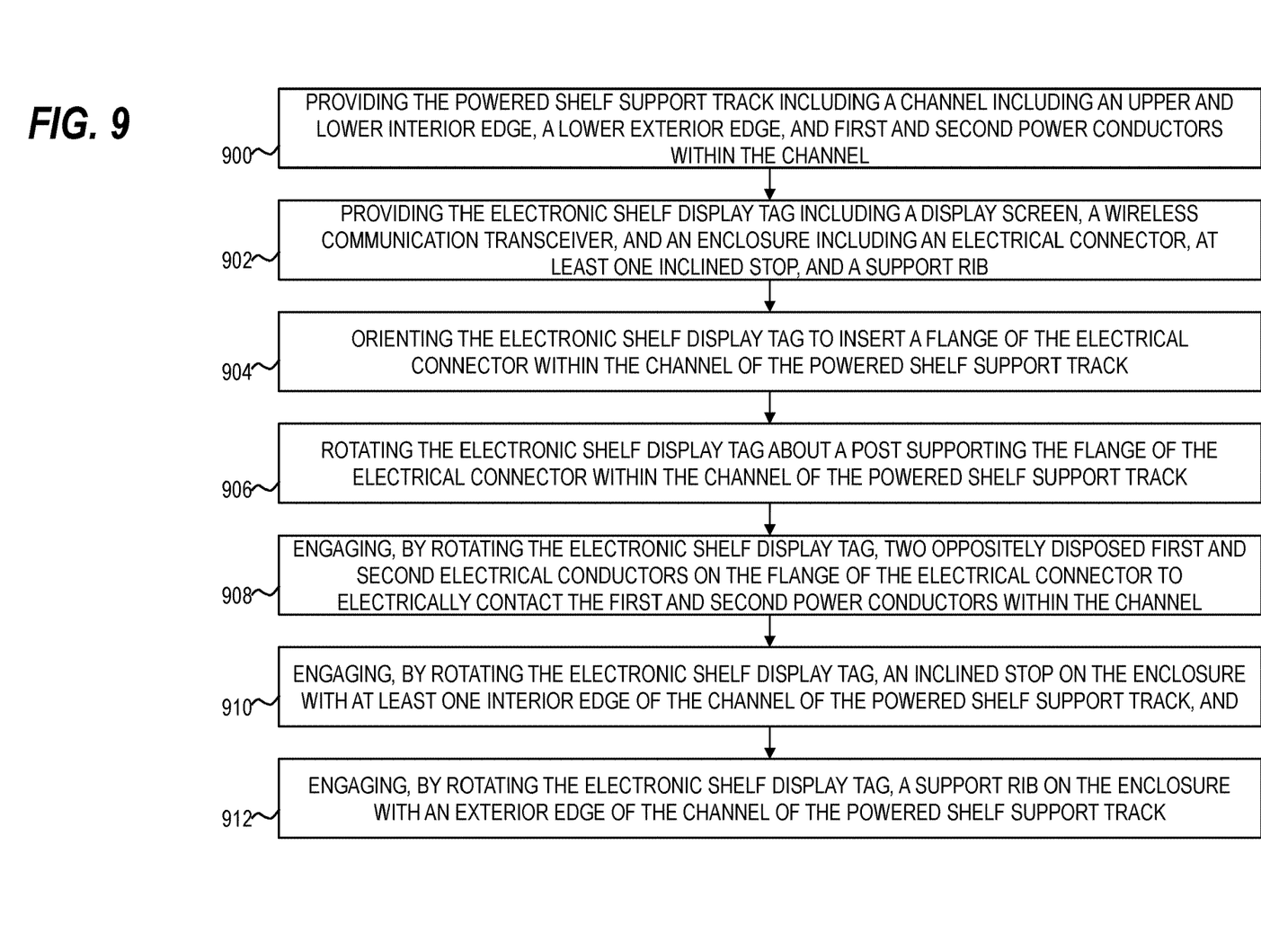
FIG. 9 illustrates a logic diagram of a method of attaching an electronic shelf display tag to a powered shelf support track.

FIG. 9 illustrates a logic diagram of a method of attaching an electronic shelf display tag 10 to a powered shelf support track 200 that comprises providing 900 the powered shelf support track 200 including a channel 210 including an upper 212 and lower 214 interior edge, a lower exterior edge 218, and first 220 and second 230 power conductors within the channel 210. The method further comprises providing 902 the electronic shelf display tag 10 including a display screen 50, a wireless communication transceiver 76, and an enclosure 20 including an electrical connector 100, at least one inclined stop 30 or 36, and a support rib 26. The method further comprises orienting 904 the electronic shelf display tag 10 to insert a conductive member 102, 104 of the electrical connector 100 within the channel 210 of the powered shelf support track 200. The method further comprises rotating 906 the electronic shelf display tag 10 relative to the powered shelf support track 200 about a projecting member 42 supporting the conductive member 100 of the electrical connector 102, 104 within the channel 210 of the powered shelf support track 200. The method further comprises engaging 908, by rotating the electronic shelf display tag 10, two oppositely disposed first 102 and second 104 electrical conductors of the electrical connector to electrically contact the first 220 and second 230 power conductors within the channel 210. The method further comprises engaging 910, by rotating the electronic shelf display tag 10, an inclined stop 30 and/or 36 on the enclosure with at least one interior edge 214, 216, 216 of the channel of the powered shelf support track 200. The method further comprises engaging 912, by rotating the electronic shelf display tag 10, a support rib 26 on the enclosure 20 with an exterior edge 218 of the powered shelf support track 200.

The method further comprises engaging, by rotating the electronic shelf display tag 10, an upper inclined stop 36 with an upper interior edge 212 of the channel 210 of the powered shelf support track 200 when the electrical connector 100 is rotated within the channel 210 of the powered shelf support track 200.

The method further comprises engaging, by rotating the electronic shelf display tag 10, a lower inclined stop 30 with a lower interior edge 214 of the channel 210 of the powered shelf support track 200 when the electrical connector 100 is rotated within the channel 210 of the powered shelf support track 200.

The method further comprises, wherein the engaging, by rotating the electronic shelf display tag 10, the support rib 26 with the exterior edge 218 of the channel 210 of the powered shelf support track 200, the upper inclined stop 36 with the upper interior edge 212 of the channel 210 of the powered shelf support track 200, the lower inclined stop 30 with the lower interior edge 218 or lower interior edge 214 of the channel 210 of the powered shelf support track 200, occurs substantively simultaneously.

The method further comprises providing power to the electronic shelf display tag 10 via the first 220 and second 230 power conductors within the powered shelf support track channel 200.

The method further comprises wirelessly receiving, at the electronic shelf display tag 10, information via the wireless communication transceiver 76, updating, at the electronic shelf display tag 10, display information on the display screen 50 based on the information received via the wireless communication transceiver 76, and entering a low power consumption mode at the electronic shelf display tag 10.

While the forms of the apparatus, system and methods described herein constitute a preferred embodiment of the invention, the present invention is not limited to the precise forms described herein, and changes may be made therein without departing from the scope of the invention defined by the appended claims.

What is claimed is:

1. An electronic shelf display tag apparatus comprising:
   a programmable processor having a memory in communication with each of
      a display screen, and
      a wireless communication transceiver;
   a power supply device configured to supply power to the processor, the display screen, and the wireless communication transceiver; and
   an enclosure configured to encapsulate the processor, the display screen, the wireless communication transceiver, and the power supply device, the enclosure further including
      an electrical connector having at least one conductor in communication with the power supply device, wherein the electrical connector further comprises:
         a projecting member configured to be inserted into and rotated within the channel of the shelf support track,
         two oppositely disposed first and second electrical conductors disposed on a distal end of the projecting member configured to be inserted into and rotated within the channel of the shelf support track, the two oppositely disposed first and second electrical conductors configured to engage corresponding first and second power conductors within the channel of the shelf support track,
      at least two inclined stops configured to engage an interior edge of a channel of a shelf support track, wherein the inclined stops disposed on a rear face of the enclosure opposite the display screen comprise an upper inclined stop configured to engage an upper interior edge of the channel of the shelf support track when the electrical connector is rotated within the channel of the shelf support track to a locked position, and a lower inclined stop configured to engage a lower interior edge of the channel of the shelf support track when the electrical connector is rotated within the channel of the shelf support track to the locked position, and
      a support rib configured to engage an exterior edge of the channel of the shelf support track.

2. The apparatus according to claim 1, wherein the display screen is disposed on a front face of the enclosure further comprises at least one of:
   a e-paper display;
   an LCD display; or
   an LED display.

3. The apparatus according to claim 1, wherein the support rib is disposed on a rear face of the enclosure opposite the display screen and configured to engage a lower exterior edge of the channel of the shelf support track when the electrical connector is rotated within the channel of the shelf support track to a locked position.

4. The apparatus according to claim 1, wherein the enclosure further comprises at least one audio port disposed on a rear face of the enclosure opposite the display screen and configured to provide audio from an audio playback device outside of a profile projection of the shelf support track onto the enclosure.

5. An electronic shelf display system comprising:
   a shelf support track comprising:
      a channel including and first and second power conductors within the channel; and
   an electronic shelf display tag comprising:
      a programmable processor having a memory in communication with each of a display screen, and a wireless communication transceiver;
      a power supply device configured to supply power to the programmable processor, the display screen, and the wireless communication transceiver; and
      an enclosure configured to encapsulate the programmable processor, the display screen, the wireless communication transceiver, and the power supply device, the enclosure further including
         an electrical connector having at least one conductor in communication with the power supply device, wherein the electrical connector further comprises:
            a projecting member configured to be inserted into and rotated within the channel of the shelf support track; and
            two oppositely disposed first and second electrical conductors disposed on a distal end of the projecting member and configured to be inserted into and rotated within the channel of the shelf support track, the two oppositely disposed first and second electrical conductors configured to engage the corresponding first and second power conductors within the channel of the shelf support track;
         at least two inclined stops configured to engage an interior edge of the channel of the shelf support track, wherein the inclined stops disposed on a rear face of the enclosure opposite the display screen comprise an upper inclined stop configured to engage an upper interior edge of the channel of the shelf support track when the electrical connector is rotated within the channel of the shelf support track to a locked position, and a lower inclined stop configured to engage a lower interior edge of the channel of the shelf support track when the electrical connector is rotated within the channel of the shelf support track to the locked position, and a support rib configured to engage an exterior edge of the shelf support track.

6. The system according to claim 5, wherein the display screen is disposed on a front face of the enclosure further comprises at least one of:

a e-paper display;

an LCD display; or an LED display.

7. The system according to claim 5, wherein the support rib is disposed on a rear face of the enclosure opposite the display screen and configured to engage a lower exterior edge of the channel of the shelf support track when the electrical connector is rotated within the channel of the shelf support track to a locked position.

8. The system according to claim 5, wherein the enclosure further comprises at least one audio port disposed on a rear face of the enclosure opposite the display screen and configured to provide audio from an audio playback device outside of a profile projection of the shelf support track onto the enclosure.

9. A method of attaching an electronic shelf display tag to a powered shelf support track comprising:

providing the powered shelf support track including a channel including an upper and lower interior edge, a lower exterior edge, and first and second power conductors within the channel;

providing the electronic shelf display tag including a display screen, a wireless communication transceiver, and an enclosure including an electrical connector, at least two inclined stops, and a support rib;

orienting the electronic shelf display tag to insert a conductive member of the electrical connector within the channel of the powered shelf support track;

rotating the electronic shelf display tag about a projecting member supporting the conductive member of the electrical connector within the channel of the powered shelf support track;

engaging, by rotating the electronic shelf display tag, two oppositely disposed first and second electrical conductors on the conductive member of the electrical connector to electrically contact the first and second power conductors within the channel;

engaging, by rotating the electronic shelf display tag, the inclined stops on the enclosure with at least one interior edge of the channel of the powered shelf support track, wherein the inclined stops comprise an upper inclined stop that engages with an upper interior edge of the channel of the powered shelf support track when the electrical connector is rotated within the channel of the powered shelf support track and a lower inclined stop that engages with a lower interior edge of the channel of the powered shelf support track when the electrical connector is rotated within the channel of the powered shelf support track; and engaging, by rotating the electronic shelf display tag, a support rib on the enclosure with an exterior edge of the channel of the powered shelf support track.

10. The method according to claim 9, wherein the engaging, by rotating the electronic shelf display tag, the support rib with the exterior edge of the channel of the powered shelf support track, the upper inclined stop with the upper interior edge of the channel of the powered shelf support track, and the lower inclined stop with the lower interior edge of the channel of the powered shelf support track, occurs substantively simultaneously.

11. The method according to claim 9, the method further comprises providing power to the electronic shelf display tag via the first and second power conductors within the powered shelf support track channel.

12. The method according to claim 9, the method further comprises:

wirelessly receiving, at the electronic shelf display tag, information via the wireless communication transceiver;

updating, at the electronic shelf display tag, display information on the display screen based on the information received via the wireless communication transceiver; and entering a low power consumption mode at the electronic shelf display tag.

* * * * *